Feb. 17, 1942.     W. VAN B. ROBERTS     2,273,144
FREQUENCY MODULATION DETECTOR
Filed Oct. 16, 1940     3 Sheets-Sheet 3

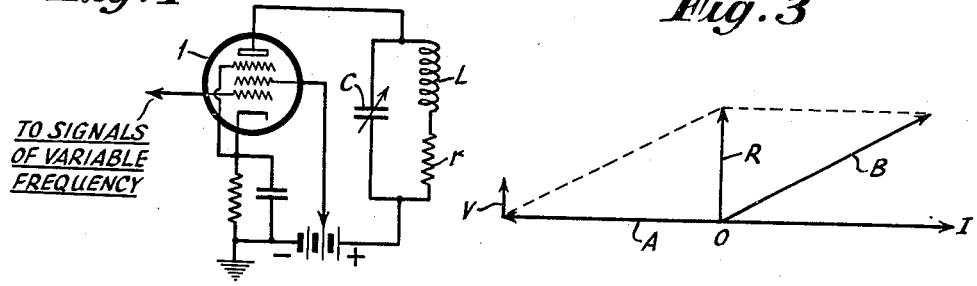
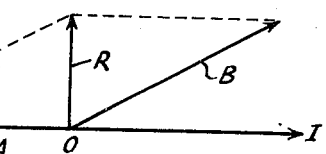
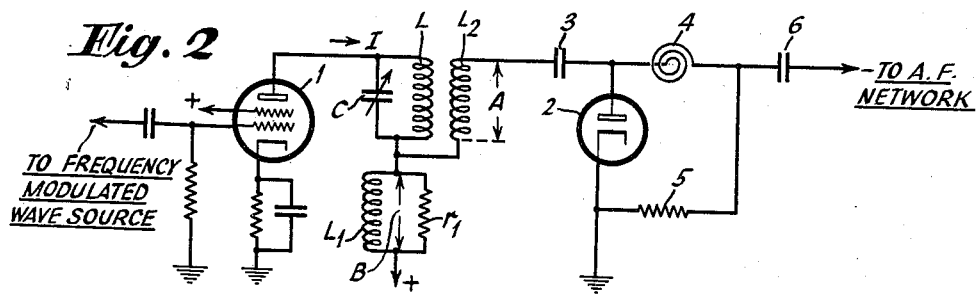
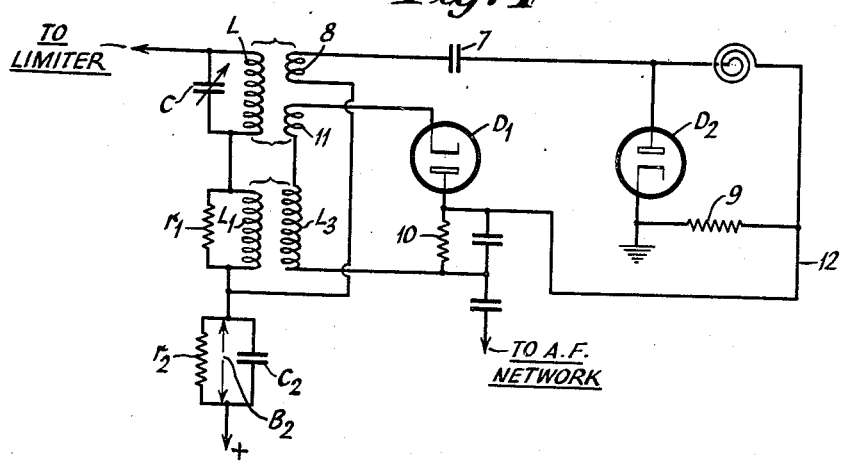
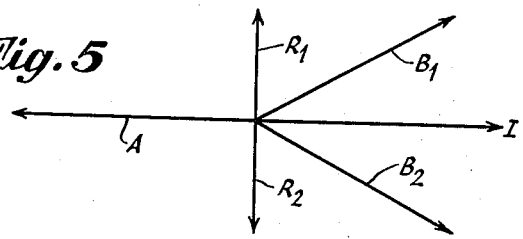

INVENTOR
Walter Van B. Roberts
BY
ATTORNEY

Patented Feb. 17, 1942

2,273,144

UNITED STATES PATENT OFFICE 2,273,144

FREQUENCY MODULATION DETECTOR

Walter van B. Roberts, Princeton, N. J., assignor to Radio Corporation of America, a corporation of Delaware Application October 16, 1940, Serial No. 361,369

10 Claims. (Cl. 250—27)

My present invention relates to detectors of frequency, or phase, modulated carrier waves, and more particularly to frequency modulation detectors of an improved type.

Frequency modulation detectors in the past have utilized the variation of voltage magnitude which occurs when the signal carrier frequency varies about a value which is slightly above or below the resonant frequency of a tuned circuit upon which signals are impressed. Other detection systems are known in which frequency modulated carrier signals are impressed upon a resonant circuit which is accurately tuned to the mean frequency of the signal so that the effect of frequency variation is chiefly to cause a variation of the phase of the voltage developed in this resonant circuit rather than its magnitude. This variable phase voltage has been combined with another voltage with which it is in quadrature at the mean signal frequency.

One of the main objects of my present invention is to make more efficient use of the relatively large vector increment of voltage than has been secured hitherto to vary the voltage impressed on a frequency modulation detector as the mean frequency of the frequency modulated signals varies.

Another important object of my invention may be stated to reside in the provision of a detection system employing waves having a frequency variable about a mean frequency, wherein there is employed a circuit resonant to the mean frequency for developing a voltage whose phase varies rapidly with frequency departures from the mean frequency, a pair of voltages of relatively constant phase and magnitude being developed separately, one of the pair of voltages being combined with said first voltage to produce a resultant which at the mean frequency is substantially in quadrature with the first voltage, and the other of said pair being combined with the first voltage to produce a second resultant in substantial phase opposition to the first resultant at the mean frequency.

Still other objects of my invention are to improve generally the efficiency of frequency modulation detectors, and to provide specifically frequency modulation detector circuits which are not only reliable and economical, but are readily manufactured and assembled in frequency modulation receivers.

The novel features which I believe to be characteristic of my invention are set forth in particularity in the appended claims; the invention itself, however, as to both its organization and method of operation will best be understood by reference to the following description taken in connection with the drawings in which I have indicated diagrammatically several circuit organizations whereby my invention may be carried into effect.

In the drawings—

Fig. 1 shows a simple network to explain the fundamental theory of operation,

Fig. 2 illustrates a frequency modulation detector embodying the invention,

Figure 6:
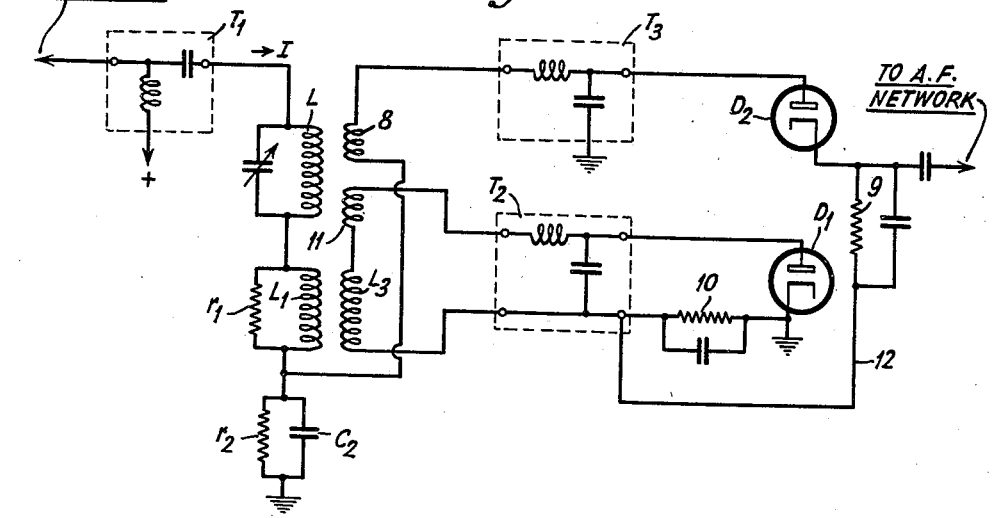

Fig. 3 graphically explains the discriminator action of Fig. 2,

Fig. 4 illustrates a frequency modulation detector utilizing push-pull rectifiers, Fig. 5 graphically presents the operation of the detection circuit of Fig. 4, Figs. 6, 7, 8 show respectively different modifications of the invention.

Referring now to the accompanying drawings, wherein like reference characters in the different figures designate similar circuit elements, in Fig. 1 is shown a tube 1 upon whose signal grid are impressed signals of variable frequency. In the plate circuit of tube 1 is included a resonant circuit comprising a coil L shunted by condenser C, the letter $r$ denoting the circuit resistance. The circuit L—C is tuned to the mean, or center, frequency of the applied frequency modulated waves.

Considering the circuit of Fig. 1 it can be shown that if the signal frequency departs from the resonant frequency by a small amount $df$, the phase of the voltage developed across the circuit L—C changes slightly without appreciable change in magnitude. The new voltage can be considered as the resonant frequency voltage plus a small incremental voltage vectorially added thereto. This small increment being added at right angles makes substantially no difference to the magnitude, but only to the phase of the circuit voltage. The vector increment of voltage referred to is approximately $$\left(j\frac{4\pi L df}{r}\right)$$

times the voltage developed at resonance. Next, consider the case where the same circuit of Fig. 1 is sufficiently detuned from the mean signal frequency so that a slight change of frequency $df$ produces the maximum possible change in the magnitude of the voltage across the circuit. A calculation of the voltage change together with a maximization of this change with respect to the adjustment of the circuit indicates that the greatest voltage change which can be produced by the given slight change in frequency, $df$, when operating in this manner, is only $$\frac{2}{3\sqrt{3}}$$

times the vector increment which results when operating with the circuit L—C tuned exactly to the mean frequency.

It is, therefore, the primary object of the present invention to make use of the above-mentioned relatively large vector increment to vary the voltage impressed on a detector as the frequency varies. A particular object of the invention is to produce on the detector, at the mean frequency, a voltage which is of the same phase as that of the aforesaid vector increment so that the detector voltage will vary with varying frequency in the most rapid fashion possible. In this manner an improvement is obtained over previous systems which used the vector increment of voltage, but which combined it with an out-of-phase mid-frequency voltage so that the vector increment was not fully effective to vary the detector voltage.

There is shown in Fig. 2 a system embodying the simplest form of the invention. Let it be assumed that tube 1 has impressed on its signal input grid signal waves of a variable frequency. For example, these waves could be phase, or frequency, modulated carrier waves, and, more specifically, the signals could be such as are radiated at the present time in the 43–50 megacycle band. The plate of tube 1 includes in series relation the resonant circuit L—C and the impedance network $L_1$—$r_1$. The diode rectifier 2 has its cathode at ground potential, while its anode is connected to the junction of L—$L_1$ by a small condenser 3 and coil $L_2$. Coils $L_2$ and L are magnetically coupled. The diode anode is further connected to the cathode through the path comprising the carrier frequency choke coil 4 and load resistor 5. There is developed across resistor 5 voltage corresponding to the amplitude variation produced by the discriminator, and this variable voltage is transmitted by coupling condenser 6 to the following network. Where the carrier is varied in frequency by audio modulation currents then the network following rectifier 2 would be an audio utilization network.

In the arrangement of Fig. 2 a voltage developed across the impedance network $L_1$—$r_1$ is combined with a voltage proportional to, but of reversed polarity compared to, the voltage developed across circuit L—C which is tuned to the mean, or center, frequency. The circuit constants are adjusted so that the vector increment voltage developed in coil $L_2$ with frequency departure from the mean frequency is in phase with the total voltage on the detector at the mean frequency. Fig. 3 illustrates the vector relations between the various voltages, and it is to be understood that these relations are depicted in a purely qualitative manner.

The current vector I represents the plate current of the tube 1, and this current flowing through the inductive impedance network $L_1$—$r_1$ produces a leading voltage B. At the resonant frequency of tuned circuit L—C the voltage drop across the tuned circuit is in phase with current I, but, due to the reversal of the winding of $L_2$, the voltage induced therein is of opposite polarity as indicated by vector A. If, now, the magnitudes of voltages A and B are so adjusted that the component of B along the direction of A is equal to A, then the resultant of voltages A and B, which is shown as R, will be at right angles to A. This resultant R is the voltage impressed upon the rectifier 2 when the frequency is the resonant frequency of circuit L—C, which, in turn, is the mean frequency of the frequency modulated signal.

If, now, the frequency departs slightly from this value, the phase of voltage A changes or, what is the same thing, a small vector increment indicated as V is added at right angles to A, and, hence, is directly added to the resultant R. Of course, if the frequency shifts in the opposite direction the incremental voltage will be subtracted from R. Thus, the detector voltage will be changed by the full amount of the incremental voltage. This contrasts with previous systems using the vector increment in such a way that only a component thereof is added to, or subtracted from, the resultant voltage on the detector at the mean frequency.

The invention may, also, be applied in circuits where it is desired to operate a pair of rectifiers in opposing relation. Fig. 4 shows an elaboration of the arrangement shown in Fig. 2, and may be considered as employed between the limiter stage and audio network of a receiver of the superheterodyne type. In such case the circuit L—C would be tuned to the operating intermediate frequency which could be at about 2.75 megacycles. The tuned circuit L—C would be connected to the plate of the usual limiter tube, the input circuit of the latter being fed with signals whose center frequency is of the intermediate frequency value. In series with L—C are arranged the impedance networks $L_1$—$r_1$ and $C_2$—$r_2$.

One of the diode rectifiers $D_2$ has its anode connected to the junction of $L_1$—$C_2$ through a path comprising small condenser 7 and coil 8, while its cathode is grounded. Resistor 9 serves as the rectifier load. Coil 8 and coil L are magnetically coupled. Diode $D_1$ has its cathode connected to the anode through a path comprising coil 11, coil $L_3$ and load resistor 10, the latter being by-passed for intermediate frequency currents. Coil 11 is magnetically coupled to coil L, while coils $L_3$ and $L_1$ are magnetically coupled. The anode end of resistor 9 is connected by lead 12 to the anode end of resistor 10. The audio modulation voltage is taken off at the anode end of resistor 10.

The circuit operation of Fig. 4 is best explained by reference to the vector diagram of Fig. 5. It will be seen that Fig. 5 differs from Fig. 3 only in the addition of a second vector $B_2$ and a second resultant $R_2$. The vector $B_2$ is a lagging voltage produced by the flow of current through impedance network $r_2$—$C_2$, and this voltage combined with the voltage represented by A as before produces the resultant $R_2$ which is impressed upon rectifier $D_2$. At the same time by way of coil $L_3$ the voltage $B_1$ is derived from the drop across the network $r_1$—$L_1$, and this is combined with the voltage derived from tuned circuit L—C, just as in Fig. 2, to produce the resultant $R_1$ which is impressed upon rectifier $D_1$. The output voltages of the two detectors may be connected in series, as shown, and in opposing relation so that audio frequency output is obtained in the usual fashion.

It is evident that when the vector A suffers a vector increment this increment will add to one of the resultant voltages while subtracting from the other.

Due to the distributed capacities the magnitudes of the voltages developed in the circuit of Fig. 4 may not be as great as would be desired, and in Fig. 6 there is shown means to operate the essential elements of Fig. 4 in a condition of large current and low voltage, and further means for stepping up the resultant voltages again prior to application to the rectifiers. The network $T_1$ is a well known type of network adapted to transform the small plate current of the limiter tube to a much larger plate current indicated as (I) which is then passed through relatively low impedance elements which have, however, the same relations as the corresponding elements of Fig. 4. The two resultant voltages developed for application to the rectifiers $D_1$ and $D_2$ are individually stepped up by way of the respective transforming networks $T_2$ and $T_3$ which are also of well known design. The audio voltage in this case is taken from the cathode end of resistor 9.

Figure 7:
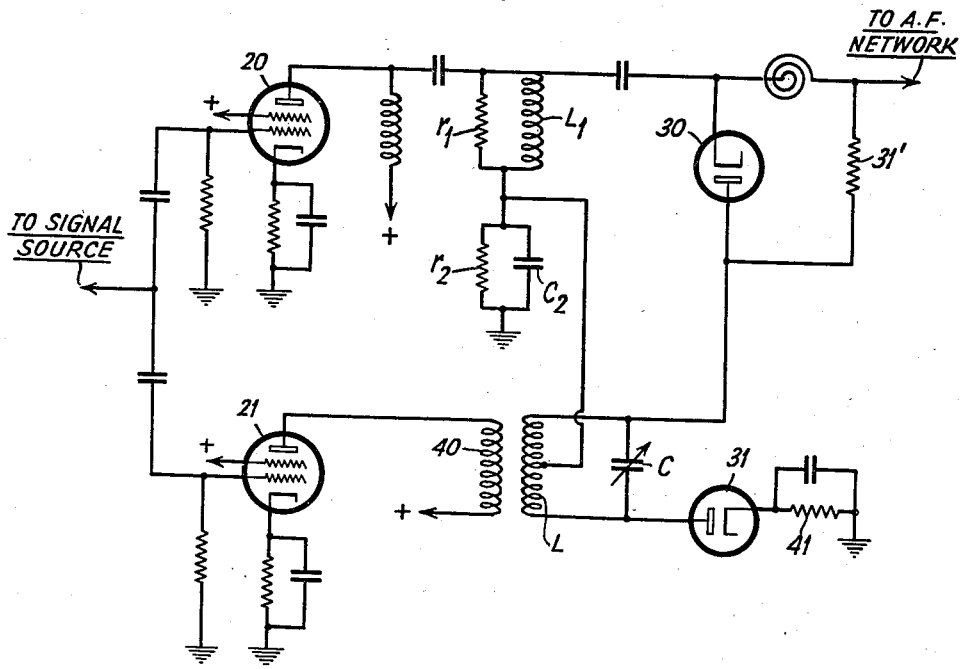

In Fig. 7 there is shown another modification of the invention wherein the two relatively constant phase voltages required for the double rectifier operation are developed from one amplifier tube 20, while the resonant voltage is developed from another amplifier tube 21. This arrangement permits developing larger component voltages, and, hence, a larger resultant voltage is impressed upon the rectifiers 30—31. The upper rectifier 30 receives a voltage which is the sum of the voltage drops across the upper impedance elements in each plate circuit, while the lower rectifier 31 receives the sum of the voltages across the lower impedance elements of the two circuits. The impedance networks $r_1$—$L_1$ and $r_2$—$C_2$ are arranged in series between the high potential side of the system and ground. The cathode of diode 30 is coupled to the high potential side of $r_1$—$L_1$. The resistor 31' acts as the load for rectifier 30. The tuned circuit L—C, which is resonant to the intermediate frequency, has the anode of diode 31 connected to one side. The junction of $L_1$—$C_2$ is connected to the midpoint of coil L.

The plate circuit of amplifier 21 may include the coil 40 magnetically coupled to coil L. Diode 31 has its cathode connected to ground through load resistor 41 which is properly bypassed for intermediate frequency currents. The resistors 41 and 31' are arranged in polarity opposition so that the audio modulation is taken off from the cathode end of resistor 31'.

Figure 8:
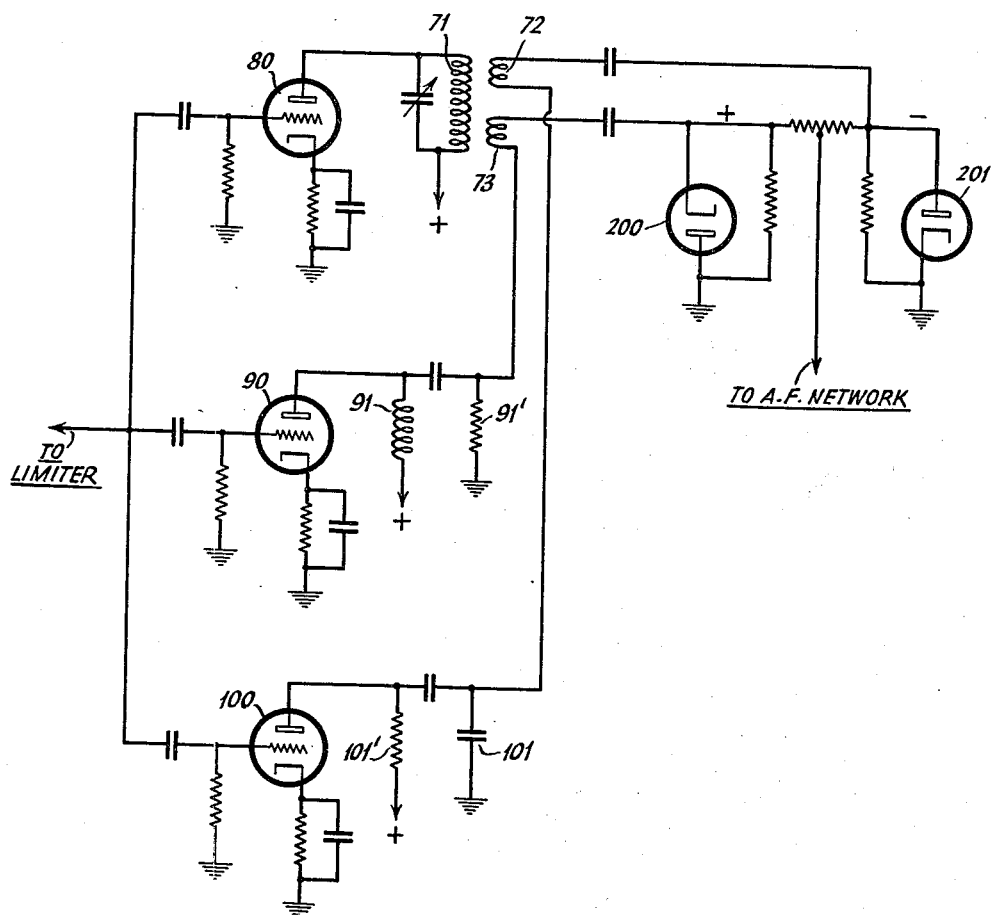

Fig. 8 illustrates a modification wherein the resonant voltage component for each of the rectifiers is produced across the resonant circuit 71. The latter is arranged in the plate circuit of amplifier tube 80. The amplifier tube 90 has its signal grid coupled to the frequency modulated signal source, as has the amplifier 80. The coil 91, arranged in the plate circuit of tube 90, develops one of the relatively constant phase voltages for rectifier 200, while the second relatively constant phase voltage for rectifier 201 is developed across condenser 101. The condenser is coupled to the plate circuit of amplifier 100. The coil 72 magnetically couples resonant circuit 71 to rectifier 201, and coil 73 magnetically couples rectifier 200 to the resonant circuit. It will be noted that network $r_1$—$L_1$ of Fig. 7 corresponds to 91—91' of Fig. 8, and $r_2$—$C_2$ corresponds to 101'—101.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. In a frequency modulation detector, a circuit exactly resonant to the mid-frequency of frequency modulated signals, means to produce a voltage in said circuit whose phase varies with frequency variations, a second reactive circuit, means to produce therein a second voltage whose phase varies relatively little with frequency variations, the constants of the resonant and second circuits being so chosen that the resultant of said two voltages is substantially at right angles to said first voltage at the mid-frequency and vector increments to said first voltage due to frequency departures from the mid-frequency are substantially in phase with said resultant, means to combine said voltages to produce said resultant, and detecting means for said resultant.

2. In a frequency modulation system, a circuit exactly resonant to the mid-frequency of frequency modulated signals for developing a voltage whose phase varies rapidly in accordance with frequency departures from said mid-frequency, reactive means for developing at least two voltages of relatively constant phase and magnitude, means for combining one of said relatively constant voltages with said varying phase voltage to produce a resultant which at the mid-frequency is substantially in quadrature with said varying phase voltage, means for combining the other of said relatively constant voltages with said varying phase voltage to produce a second resultant voltage in substantial phase opposition with said first resultant at said mid-frequency, separate detecting means for each of said resultants, and means for combining the output voltages of said detectors in opposition.

3. In a frequency modulation detector, a circuit exactly resonant to the mid-frequency of frequency modulated signals, means to produce a voltage in said circuit whose phase varies with frequency variations, a second reactive circuit, means to produce therein a second voltage whose phase varies relatively little with frequency variations, the relative magnitude and phases of said voltages being so chosen that their resultant is substantially at right angles to said first voltage at the mid-frequency, whereby vector increments to said first voltage due to frequency departures from the mid-frequency are substantially in phase with said resultant, means to combine said voltages to produce said resultant, and detecting means for said resultant, means for reducing said second voltage while increasing the current associated therewith, and means for increasing said resultant voltage.

4. In a detector for frequency modulated waves where the wave frequency is varied about a center frequency in accordance with modulation signals, a circuit exactly resonant to said center frequency, means to produce in said circuit from said waves a first voltage whose phase varies relatively rapidly with frequency variation, a second reactive circuit, means in the latter to produce from said waves a second voltage whose phase varies relatively slowly with frequency variation, the constants of said resonant and second circuits being so adjusted that the resultant of said two voltages is substantially in quadrature with said first voltage at the center frequency whereby vector increments to said first voltage resulting from frequency departures from said center frequency are substantially in phase with said resultant, and means to combine said first and second voltages to produce said resultant.

5. In a frequency modulation detection system employing waves having a frequency variable about a mean frequency, a circuit exactly resonant to said mean frequency for developing a voltage whose phase varies rapidly with frequency departures from said mean frequency, reactive means for developing a pair of voltages of relatively constant phase and magnitude, means for combining one of said pair with said first voltage to produce a resultant which at the mean frequency is substantially in quadrature with said first voltage, means for combining the other of said pair with said first voltage to produce a second resultant in substantial phase opposition to said first resultant at said mean frequency, separate detecting means for each of said resultants, and means for combining the output voltages of said detecting means in opposition.

6. In a detector for frequency modulated carrier waves, a circuit exactly resonant to the carrier frequency, means to produce in said circuit from said waves a first voltage whose phase varies relatively rapidly with frequency variation, reactive means to produce from said waves a second voltage whose phase varies relatively slowly with frequency variation, the constants of said resonant circuit and reactive means being so adjusted that the resultant of said two voltages is substantially in quadrature with said first voltage at the carrier frequency and vector increments to said first voltage resulting from frequency departures from said carrier frequency are substantially in phase with said resultant and means to combine said first and second voltages to produce said resultant.

7. In a detector for phase or frequency modulated carrier waves, a circuit exactly resonant to the carrier frequency, means to produce in said circuit from said waves a first voltage whose phase varies relatively rapidly with frequency variation, a reactive impedance circuit to derive from said waves a second voltage whose phase varies relatively slowly with frequency variation, the constants of said resonant circuit and reactive circuit being so adjusted that the resultant of the two voltages is substantially in quadrature with said first voltage at the carrier frequency whereby vector increments to said first voltage resulting from frequency departures from said carrier frequency are substantially in phase with said resultant, means to combine said first and second voltages to produce said resultant, and detecting means for said resultant.

8. In a detection system for waves having a frequency variable about a mean frequency, a circuit exactly resonant to said mean frequency for developing a voltage whose phase varies rapidly with frequency departures from said mean frequency, reactive means for developing a pair of voltages of relatively constant phase and magnitude means for combining one of said pair with said first voltage to produce a resultant which at the mean frequency is substantially in quadrature with said first voltage, means for combining the other of said pair with said first voltage to produce a second resultant in substantial phase opposition to said first resultant at said mean frequency, separate detecting means for each of said resultants, means for combining the output voltages of said detecting means in opposition, and means for indicating the difference between said output voltages.

9. In a detection system for waves having a frequency variable about a mean frequency, a tuned circuit exactly resonant to said mean frequency for developing a voltage whose phase varies rapidly with frequency departures from said mean frequency, a pair of reactive impedance circuits for developing a pair of voltages of relatively constant phase and magnitude, means for combining one of said pair with said first voltage to produce a resultant which at the mean frequency is substantially in quadrature with said first voltage, means for combining the other of said pair with said first voltage to produce a second resultant in substantial phase opposition to said first resultant at said mean frequency, separate detecting means for each of said resultants, means for combining the output voltages of said detecting means in opposition, and means for indicating the difference between said output voltages.

10. In a detection network for frequency, or phase, modulated carrier waves, a resonant circuit tuned to the mean frequency of said waves for developing a first voltage in phase with current therethrough at the mean frequency, said voltage lagging or leading as frequency goes above or below the mean frequency, a second circuit, including resistance and reactance, in circuit with said resonant circuit, said second circuit producing a second voltage differing in phase from the current therethrough by an amount lying between zero and 90 degrees for all transmitted frequencies, means for passing currents of said modulated waves through said circuits to develop said voltages, means combining said voltages to form a vector sum voltage, means for adjusting one of said two voltages to bring said sum voltage substantially into quadrature with the said first voltage, and means to detect the said sum voltage.

WALTER van B. ROBERTS.